Nov. 24, 1931. A. T. LARSON 1,833,188
METHOD OF CONDUCTING CATALYTIC EXOTHERMIC GASEOUS REACTIONS
Filed April 12, 1927
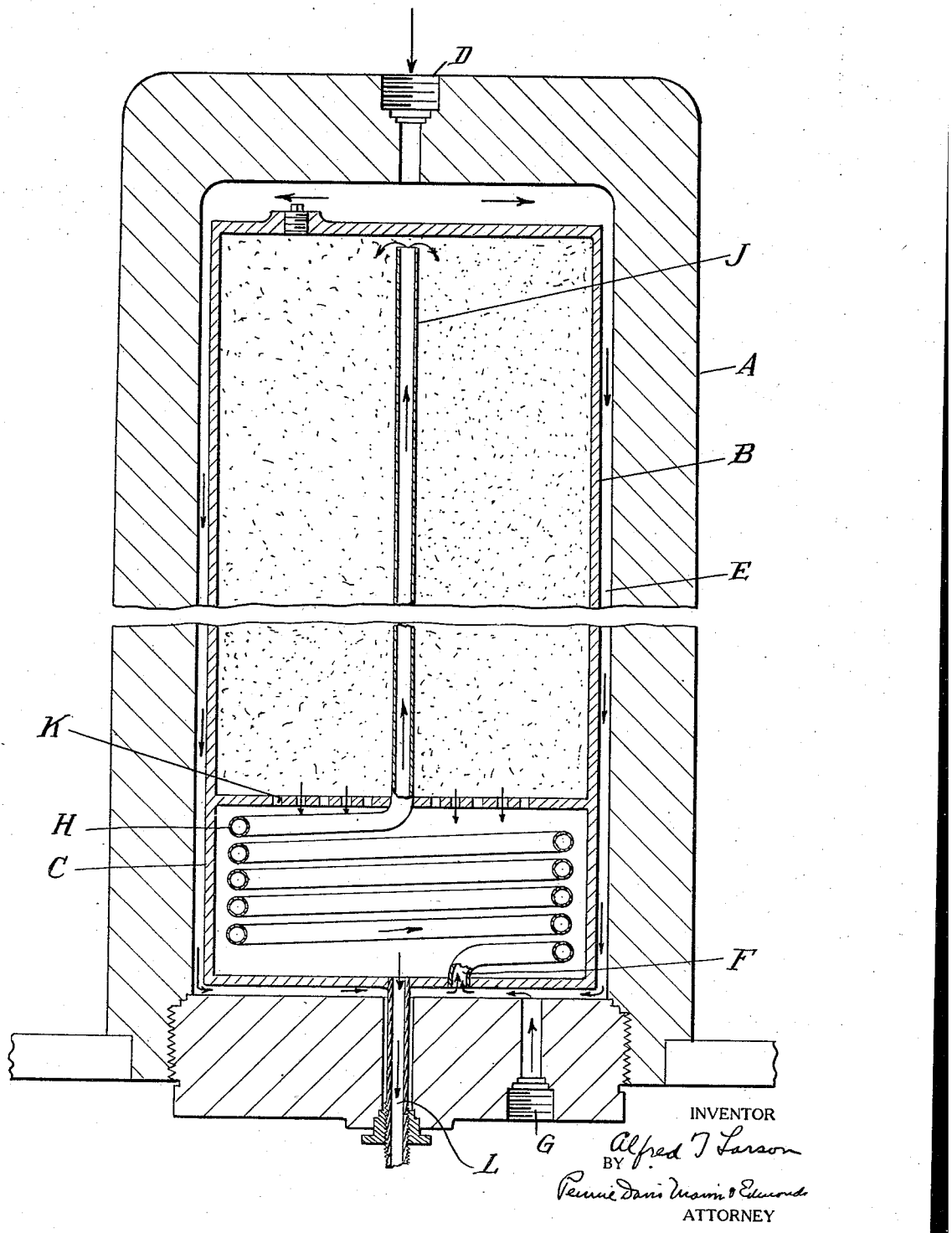
INVENTOR
Alfred T Larson
BY
Pennie Davis Marvin & Edmonds
ATTORNEY Patented Nov. 24, 1931

1,833,188

UNITED STATES PATENT OFFICE

ALFRED T. LARSON, OF WILMINGTON, DELAWARE, ASSIGNOR TO DU PONT AMMONIA CORPORATION, OF WILMINGTON, DELAWARE, A CORPORATION OF DELAWARE

METHOD OF CONDUCTING CATALYTIC EXOTHERMIC GASEOUS REACTIONS

Application filed April 12, 1927. Serial No. 183,147.

This invention relates to a method of and apparatus for conducting catalytic exothermic gaseous reactions under pressure and particularly to the synthesis of ammonia from gaseous mixtures of nitrogen and hydrogen.

In carrying out the catalytic synthesis of ammonia under pressure it is necessary to protect the pressure-sustaining wall of the reaction apparatus from the heat evolved by the reaction. Otherwise the deteriorating effects of high temperature combined with the destructive action of the compressed hydrogen may result in weakening of the wall to the point of disruption. One method of protecting the wall is described in U. S. Patent No. 1,544,373. It consists in passing the relatively cooler mixture of nitrogen and hydrogen going to the reaction between the pressure-sustaining wall and the catalyst. The entering gaseous mixture is thus made to play a double role in that it removes heat from the catalyst and simultaneously forms a protective screen for the pressure-sustaining wall, thereby keeping the temperature of the latter below the point at which its mechanical strength might be impaired.

When, however, this method is applied to synthesis processes in which the uncombined nitrogen and hydrogen, after removal of ammonia produced by the synthesis reaction, is passed again over the same or another body of catalyst, considerable difficulty is occasioned by the small but appreciable quantities of ammonia inevitably remaining in the uncombined gases if the ammonia is removed by the methods customarily used in practical operation, and particularly by condensation under pressure. If the gases leaving the ammonia removal system are passed, either with or without make-up gas,—i. e., fresh nitrogen-hydrogen mixture to compensate for the nitrogen and hydrogen removed as ammonia—into the reaction apparatus between the pressure-sustaining wall and the catalyst container, the ammonia in the gases attacks the metal of the pressure-sustaining wall, probably by forming a nitride. The corroding action of this relatively small proportion of ammonia is more vigorous, even at relatively low temperature, than that of either the hydrogen or nitrogen with which it is associated and it may in time give rise to serious consequences.

The difficulty could be eliminated by effecting complete removal of ammonia from the nitrogen-hydrogen mixture and it might be obviated to some extent by employing special alloys, resistant to attack by ammonia, in the construction of the pressure-sustaining wall. Neither of these expedients is to be recommended, however, as an economical and satisfactory solution of the problem.

It is the object of the present invention to provide an improved synthesis apparatus and a method of protecting the pressure-sustaining wall in ammonia synthesis and other exothermic gaseous reactions wherein like difficulties are encountered.

Other objects and advantages will be apparent as the invention is better understood by reference to the following specification in which its preferred embodiments are described.

In accordance with this invention, the pressure-sustaining wall is cooled by the make-up gases as distinct from the gases which have previously passed through the reaction and recovery apparatus; that is, the fresh nitrogen-hydrogen mixture, after being raised to the pressure at which the reaction is to be carried out, is passed into the synthesis apparatus between the catalyst container and the pressure-sustaining wall, the gases containing residual ammonia being thereafter added to the make-up gases before the mixture passes into contact with the catalyst. The pressure-sustaining wall can thus be adequately protected from the heat of the reaction and the possibility of deterioration of the pressure-sustaining wall by contact of ammonia therewith can be avoided.

Although the invention is susceptible of embodiment in many different forms with respect to details of apparatus and procedure, one arrangement of apparatus is shown for purposes of illustration in the accompanying drawing, in which—

The figure is a diagrammatic representation of an aparatus adapted for the manufacture of synthetic ammonia in accordance with the invention.

Referring to the figure the apparatus comprises a metallic pressure-sustaining wall A, enclosing a catalyst receptacle B which is spaced therefrom to provide a passage for the cooling gas. A heat exchange compartment C permits warming the gases going to the reaction at the expense of the hot gases leaving the catalyst. Inlets D and G, and an outlet L are provided for the gases. In carrying out the synthesis of ammonia the fresh compressed nitrogen-hydrogen mixture, i. e., the make-up gas, enters the apparatus through the inlet D. It passes thence through the annular passage E, where it protects the wall A from the heat of the reaction and at the same time removes a certain amount of heat from the catalyst through the wall of B. The mixture enters the heat-exchange compartment C through the orifice F along with the ammonia-containing gases which enter the apparatus through the inlet G. The mixed make-up and other gases pass through the coil H of the heat exchanger and are warmed by the outgoing gases passing into the coil. The gases then pass through the conduit J wherein they are further warmed by heat exchange with the catalyst and by the reacting gases in contact therewith. Leaving the open end of J the gases flow in the reverse direction in contact with the catalyst and there react to form ammonia. The gaseous reaction products leave the catalyst through the orifices K, pass over the coil H and are withdrawn from the apparatus through the outlet L. The gaseous products are then treated for ammonia removal by cooling in a condenser, and the uncombined nitrogen and hydrogen mixture, together with the uncondensed ammonia, is returned by a circulating pump (not shown) to re-enter the apparatus through the inlet G.

While the apparatus above described is a convenient form for use in the practice of the invention, it will be obvious that, depending upon the reaction to be carried out and the conditions under which it is to be effected, it may be found desirable to make certain modifications. Thus, the heat exchange between incoming and outgoing gases may be accomplished wholly or in part outside the reaction apparatus or may even in some cases be dispensed with. Also, the amount of heat removed from the catalyst by the gases in indirect contact therewith may be varied, depending upon the thermal conductivity of the metals of which the wall B and the conduit J are made. The amount of heat removed in this manner may also be controlled by the application of insulation to the wall B and/or the conduit J, or in some cases by eliminating the conduit J so that the gases pass directly into contact with the catalyst without preliminarily passing within and in indirect contact therewith.

The invention is not limited to the use of any specific catalyst nor to the employment of any particular range of temperatures or pressures. While especially useful in the synthesis of ammonia from its elements, the invention may also be advantageously applied to other catalytic exothermic gaseous reactions in which there is formed a product likely to attack the pressure-sustaining wall under the conditions of operation.

It will be apparent from the foregoing that the invention represents a practicable and efficient solution for the problem of corrosion of pressure-sustaining walls by contact therewith of products of the reaction. Among other important advantages it permits the use of ordinary metals, inexpensive steels, for example, where hitherto expensive corrosion-resistant alloys have been required. This advantage is of especial importance in view of the fact that in the commercial operation of high pressure reactions the charge for capital investment in equipment represents the principal item in the cost of the product.

Various changes may be made in the details of the method and apparatus hereinbefore described without departing from the invention or sacrificing any of the advantages thereof.

I claim:—

1. The method of effecting catalytic exothermic gaseous reactions under pressure, which comprises passing gases free from reaction products around the catalyst body, enveloping the same, mingling such gases thereafter with other gases containing reaction products and conducting the mingled gases into direct contact with the catalyst.

2. The method of effecting the catalytic synthesis of ammonia from its elements under pressure, which comprises passing a mixture of nitrogen and hydrogen free from ammonia around the catalyst body, enveloping the same, mingling such mixture thereafter with another gaseous mixture of nitrogen and hydrogen containing ammonia, and conducting the mingled gases into direct contact with the catalyst.

3. The method of effecting catalytic exothermic gas reactions under pressure, which comprises subjecting a gaseous mixture derived from a previous reaction in contact with the catalyst to further contact therewith, while passing a gas free from reaction products around the catalyst body, enveloping the same, and mingling such gas with the gaseous mixture before the latter contacts with the catalyst.

4. The method of effecting the catalytic synthesis of ammonia from its elements under pressure, which comprises subjecting a gaseous mixture of nitrogen and hydrogen derived from a previous reaction in contact with the catalyst to further contact therewith, while passing a gas free from ammonia around the catalyst body, enveloping the same, and mingling such gas with the gaseous mixture before the latter contacts with the catalyst.

5. The process of effecting catalytic exothermic gaseous reactions under pressure wherein a stream of make-up gas on its way to the catalyst is conveyed around the catalyst, enveloping the same, while simultaneously passing directly to the catalyst gases which have already been subjected to the catalyst and from which reaction products have been partially removed.

6. The process of effecting the synthesis of ammonia under pressure wherein a stream of make-up hydrogen-nitrogen mixture on its way to the catalyst is conveyed around the catalyst body, enveloping the same, while simultaneously passing directly to the catalyst nitrogen-hydrogen mixture which has been subjected to partial reaction and from which the resultant ammonia has been partially removed.

In testimony whereof I affix my signature.

ALFRED T. LARSON.